United States Patent [19]

Helmstetter

[11] Patent Number: 4,935,058

[45] Date of Patent: Jun. 19, 1990

[54] COATING COMPOSITION TO PREVENT CORROSION ON METALS

[75] Inventor: John G. Helmstetter, Brick, N.J.

[73] Assignee: Core-Guard Industries, Inc., Laualette, N.J.

[21] Appl. No.: 337,942

[22] Filed: Apr. 14, 1989

[51] Int. Cl.$^5$ .............. C04B 9/02; C23F 11/00; C23C 22/48; C23C 22/50

[52] U.S. Cl. .............. 106/14.11; 106/14.13; 106/14.14; 106/14.44; 106/14.45; 252/389.53

[58] Field of Search .............. 252/389.3, 387, 389.53; 106/14.05, 14.11, 14.12, 14.13, 14.14, 14.21, 14.44, 14.45

[56] References Cited

U.S. PATENT DOCUMENTS

| | | | |
|---|---|---|---|
| 3,977,888 | 8/1976 | Sano et al. | 106/74 |
| 4,143,119 | 3/1979 | Asperger et al. | 423/226 |
| 4,208,216 | 6/1980 | Yamaguchi et al. | 106/74 |
| 4,208,452 | 6/1980 | Keithler | 427/204 |
| 4,219,358 | 8/1980 | Hayashi et al. | 106/1.17 |
| 4,798,627 | 1/1989 | Schmitt et al. | 106/2 |

Primary Examiner—Dennis Albrecht
Assistant Examiner—Scott L. Hertzog
Attorney, Agent, or Firm—Stephen W. White

[57] ABSTRACT

A novel, metal protective solution is described. This solution of two parts, the first part being a mixture of one aqueous potassium silicate and two aqueous sodium silicate solutions and the second part comprising approximately equal amounts of acetic acid, zinc oxide, copper sulfate, clay and sodium bicarbonate, is stable, relatively inert and has a long shelf-life. It may be applied to metal surfaces to prevent corrosion and rust from forming thereon.

8 Claims, No Drawings

COATING COMPOSITION TO PREVENT CORROSION ON METALS

BACKGROUND OF THE INVENTION

1. Field of the Invention

This invention relates to coating compositions, and more particularly modified liquid silicate coating compositions, that are useful in treating metals for the preservation thereof. Still more particularly, this invention relates to silicate coating compositions for metal protection wherein said compositions are easy to handle and apply.

2. Discussion of the Prior Art

There are a host of prior art references which teach coating of metal elements, especially metal elements to buried within cementitious material, in order to attempt the preservation thereof. Metals such as reinforcing rods are representative of this latter application. Most of these references require alternative procedures such as heating and the like in order to improve the adhesion of the protective coating. Some require the application of a zinc coating, analogous to anodizing, for example, to achieve the requisite results. All of these procedures are expensive, toxic and require additional investment.

In assignee's co-pending application, U.S. Ser. No. 07/306,796, filed Feb. 6, 1989, there is disclosed a solution and process for coating metal parts comprising a two part solution. One part is made from an aqueous solution of an alkali metal silicate, trisodium phosphate, and at least one compound selected from the group consisting of copper sulfate and powdered zinc. The second part is an aqueous solution of acetic acid. These parts are mixed thoroughly and then can be applied, at a temperature above 40° F., to metal in order to achieve protection. Although this solution will provide some protection for metal used in, for example, cementitious material, there is still a pressing need to provide even more protection to prevent the metal from corrosion and degradation. Additionally, this solution is fairly unstable when mixed and the two parts must be kept separated until just prior to using since pre-mixed material will begin to cure to early.

There is also a pressing need to preserve and protect metals that are placed in storage, for example. Here, pieces of metal that are to be used later, for whatever reason, are kept out in the open or stored in a warehouse for this future use. These metals tend to rust and deteriorate during this storage period.

SUMMARY OF THE INVENTION

It is an object of this invention to provide a solution that can be applied to metal surfaces to prevent corrosion and deterioration thereof. It is also an object of this invention to provide a solution that is easy to apply to metal surfaces and safe to use. It is yet another object of this invention to provide a metal coating and protecting solution that has an increase shelf life. These and yet other objects are achieved by providing a metal protective coating solution comprising a two part mixture, Part A, the first part comprising a mixture of three liquid silicates of varying viscosities with the following composition:

(a) two parts of a solution of about 8.9% $Na_2O$ and about 28.7% $SiO_2$ and having a specific gravity of between 35°–40° baume;

(b) one part of a solution of about 11.0% $Na_2O$ and about 31.7% $SiO_2$ and having a specific gravity of between 40°–50° Baume; and, (c) one part of a solution of about 8.3% $K_2O$ and about 20.8% $SiO_2$ and having a specific gravity of between 65°–85° Baume;

and Part B, the second part comprising an aqueous mixture of equal amounts of acetic acid, zinc oxide, copper sulfate, kaolin and sodium bicarbonate.

DETAILED DESCRIPTION OF THE INVENTION

The use of silicate coatings to reduce corrosion in metals is known. However, it is usually necessary, after application of these prior art solutions, to further treat the metal by curing at greatly elevated temperatures. Additionally, some of the prior art references require other coatings as a sort of precoating sub layer to ensure adhesion of the silicate coating. The formulation of this invention requires no such pre-treatment or coating in order to provide excellent metal protection. In a particularly preferred embodiment, the mixture representing the solution of this invention comprises the following:

Part A:

(a) two parts (24 oz.) of a solution of about 8.9% $Na_2O$ and about 28.7% $SiO_2$ and having a viscosity of between 35°–40° Baume;

(b) one part (12 oz.) of a solution of about 11.0% $Na_2O$ and about 31.7% $SiO_2$ and having a viscosity of between 40°–50° Baume; and, (c) one part (12 oz.) of a solution of about 8.3% $K_2O$ and about 20.8% $SiO_2$ and having a viscosity of between 65°–85° Baume.

Part B:

4 parts of water 2 oz. each of acetic acid, zinc oxide, copper sulfate, kaolin and sodium bicarbonate. Broadly speaking, the ingredients in Part B may be present in amounts as follows:

Water—20 to 48 oz.

Other Ingredients (per above)—1 to 16 oz. each

The ingredients of Part B are usually mixed at about 150° F. to complete solution and then mixed with Part A before coating on the metal as previously described. Since the mixture is stable, it can be kept on the shelf for extended periods of time without losing its usefulness. For purposes of description acetic acid is added to enhance curing of the mixture and zinc oxide is added to impart water-proofing tendencies thereof. Copper sulfate is also added to improving curing, kaolin or clay added to impart body to the mixture while sodium bicarbonate is added to improve the agitation of mixing rate while the solution is being made. In addition, other ingredients may be added in smaller amounts to achieve other results. These include thinners such as formamide; antifreezes such as glycerol mono-, di- and triacetates and ethylene glycol acetate, for example. Polytetrafluorethylene may be added to improve slip and polyvinyl acetates to increase the surface tension, if so desired. Preservatives such as urea formaldehyde may also be present as well as other salts such as calcium or sodium chloride and colorants such as titanium dioxide and aluminum pigments. These other ingredients do not impart a better adhesion of the solution to the metal nor do they play a part in preventing corrosion and degradation thereof. They have alternative roles as mentioned above. Other ingredients which impart yet other characteristics, as long as they do not interfere with the operation of the solution of this invention, may also be present in small amounts. Although the aforementioned mixture is preferred, as mentioned previously, I can vary the amount of ingredients present in Part B from 1 to 16 oz. as long as they are present in equal amounts. The same results are still achieved. All of the ingredients found in my novel, metal protective solution are commonly used chemicals and may be obtained from many commercial sources. The liquid silicate mixtures are also commercially obtainable. For example, these can be purchased from The PQ Corporation of Valley Forge, Pa. and are termed "PQ® Soluble Silicates", Type SS-N®, Type SS-C® and Type Kasil®-1, for example. They are conventional, syrupy-like liquids, soluble in water.

Since my novel, metal protective mixture is carefully blended, and the ingredients selected to achieve particular results, as previously described, it has a long shelf-life even after both parts have been blended, mixed and the coating solution is ready for use. This is an important advance over the prior art since most prior art coating solutions must be mixed just prior to use and thus have reduced shelf-life.

In a particularly preferred embodiment the metal to be coated may be sandblasted to remove excess, existing rust and dirt prior to the coating of this solution. This pre-cleaning step is not a pre-requisite but may be practised to enhance the coating step. Additionally, I prefer adding a small amount (e.g. 2 to 6 oz.) of an alkali (e.g. sodium or potassium) fluorosilicate in order to lower the curing temperature from 200°-200° F. to about 40°-50° F. This is a well-known step in the prior art and most of these references describe the addition of an alkali fluorosilicate silicate coating solution to accomplish this curing temperature reduction.

The metal protective solution of this invention may be applied to metals by any conventional method. For example, it may be brushed or sprayed on the surface of the metal. The metal may be dipped into the solution or the solution electrolytically applied thereto. The solution may be used to protect metals of all types. Those used to reinforce concrete such as re-bar, may be especially mentioned here. However, other metal building components, steel plate or girders may also benefit from a coating or application of this coating. If my coating is applied to fresh steel or iron and only partially cured, it may behave as a primer for paint and enhance the adherence thereof. To demonstrate the efficacy of my metal protective and preserving solution, the following were prepared:

Part A:

(a) two parts (24 oz.) of a solution of about 8.9% $Na_2O$ and about 28.7% $SiO_2$ and having a viscosity of between 35°-40° Baume;

(b) one part (12 oz.) of a solution of about 11.0% $Na_2O$ and about 31.7% $SiO_2$ and having a viscosity of between 40°-50° Baume; and, (c) one part (12 oz.) of a solution of about 8.30% $K_2O$ and about 36.0% $SiO_2$ and having a viscosity of between 65°-85° Baume.

Part B:

6 parts (32 oz.) of water into which 2 oz. each of acetic acid, zinc oxide, copper sulfate, kaolin and sodium bicarbonate were added. The aqueous solution was mixed thoroughly at 150° F. and then a small amount (about 4 oz.) of sodium fluorosilicate added thereto. Parts A and B were then mixed together to form the protective solution of this invention.

In order to test how efficiently my solution protected metal surfaces from corrosion and rust, several portions of fresh, clean sheet steel were obtained. One portion was treated with my solution, one portion was kept untreated (Control A), and one portion treated with the same solution described in the aforementioned U.S. Ser. No. 07/306,796, filed 2/6/89. After drying and curing at ca. 40° F., all portions of metal were given an accelerated aging/corrosion test. At this time, portions treated with coating solutions (of this invention and the prior art) were shiny in appearance. In this test, the metals are immersed in an 8-14% saline solution for 24 hours and then air dried. The two, treated portions of metal had a whitish appearance while the totally untreated portion had already started to corrode. The metals were allowed to stand open to the air and examined periodically for signs of rust and corrosion. In the case of Control A (no treatment at all) rusting and pitting of the surface was clearly evident. In the case of that treated with the prior art solution (Control B) rusting and pitting of the surface was observable within 4 days. In the case of the metal treated with my novel solution, no rusting or pitting of the surface was evident after seven days in this example.

In yet another example a metal portion treated with the solution of this invention and given the aforementioned accelerated aging test remained without evidence of rust or corrosion for more than 70 days indicating the improvement in metal protection that is achieved with my novel solution. Additionally, I can mix the two parts of my solution together and still achieve a long shelf life.

I claim:

1. A metal protecting coating solution comprising a two part mixture, Part A, the first part comprising a mixture of three liquid silicates of varying viscosities with the following composition:
   (a) two parts of a solution of about 8.9% $Na_2O$ and about 28.7% $SiO_2$ and having a specific gravity of between 35°-50° Baume;
   (b) one part of a solution of about 11.0 % $Na_2O$ and about 31.7% $SiO_2$ and having a specific gravity of between 40°-50° Baume;
   (c) one part of a solution of about 8.3% $K_2O$ and about 20.80% $SiO_2$ and having a specific gravity of between 65°-85° Baume;

and Part B, the second part comprising 20 to 40 oz. by weight of water for every 5 to 80 oz. by weight of a mixture containing about equal amounts of acetic acid, zinc oxide, copper sulfate, clay and sodium bicarbonate wherein the ratio of A to B is in the range of about 0.358 to about 1.92.

2. The metal protecting solution of claim 1 wherein the ingredients of Part A are present in the following amounts in parts by weight:
   (a) 24 oz;
   (b) 12 oz; and
   (c) 12 oz;

and the ingredients of Part B are present in the following amounts in parts by weight:
   20 to 48 oz. water and mixed therein 1 to 16 oz. each of the following ingredients:
   Acetic Acid
   Zinc Oxide
   Copper Sulfate
   Kaolin
   Sodium Bicarbonate.

3. The solution of claim 2 wherein Part B is made from 32 oz. water and mixed therein 2 oz. each of the following ingredients:
Acetic Acid
Zinc Oxide
Copper Sulfate
Kaolin
Sodium Bicarbonate.

4. The solution of claim 3 wherein Part B is heated to 150° F. to achieve dissolution and mixing of the ingredients.

5. The metal protecting solution of claim 4 wherein 2 to 6 oz. by weight of alkali metal fluorosilicate is present in Part B prior to the mixing of Parts A and B.

6. A process for the protection of a metal surface from corrosion comprising applying the solution of claim 1 thereon.

7. A process for the protection of a metal surface from corrosion comprising applying the solution of claims 3 to 5 thereon.

8. The process of claim 6 wherein the metal surface is sandblasted prior to applying the solution thereon.

* * * * *